United States Patent [19]

Heule

[11] Patent Number: 4,690,595

[45] Date of Patent: Sep. 1, 1987

[54] DE-BURRING TOOL FOR THE DE-BURRING OF THE EDGES OF HOLES IN CURVED OR OBLIQUE SURFACES OF A WORK PIECE

[76] Inventor: Heinrich Heule, Kristallstrasse 6, CH-9434 Au/TG, Switzerland

[21] Appl. No.: 828,634

[22] Filed: Feb. 11, 1986

[30] Foreign Application Priority Data

Feb. 14, 1985 [DE] Fed. Rep. of Germany ....... 3505084

[51] Int. Cl.⁴ ........................ B23C 9/00; B23B 51/16
[52] U.S. Cl. .................................. 409/143; 408/173
[58] Field of Search ............. 409/232, 139, 143, 138; 408/187, 227, 146, 173

[56] References Cited

U.S. PATENT DOCUMENTS

| | | | |
|---|---|---|---|
| 3,143,923 | 8/1964 | Krzyszczuk | 408/146 |
| 4,066,380 | 1/1978 | Beck et al. | 409/143 |
| 4,165,201 | 8/1979 | Heule | 408/187 |

FOREIGN PATENT DOCUMENTS

| | | | |
|---|---|---|---|
| 105391 | 8/1979 | Japan | 408/146 |
| 113588 | 9/1979 | Japan | 408/173 |
| 1537120 | 12/1978 | United Kingdom | 409/143 |
| 2079661 | 1/1982 | United Kingdom | 408/146 |
| 837578 | 6/1981 | U.S.S.R. | 408/146 |

Primary Examiner—William R. Briggs
Attorney, Agent, or Firm—Claude A. S. Hamrick

[57] ABSTRACT

The de-burring tool is designed for the de-burring of the edges of holes preferably in curved or oblique surfaces of a work piece and consists of a rotationally-driven tool holder on which one or more cutters are arranged which are controlled in axial displacement. Control is achieved in that the tool holder itself is axially displaceably mounted in a fixed base body, in which the axial displacement of the tool holder is achieved through a cam which follows the curvature of the edge of the hole.

1 Claim, 5 Drawing Figures

DE-BURRING TOOL FOR THE DE-BURRING OF THE EDGES OF HOLES IN CURVED OR OBLIQUE SURFACES OF A WORK PIECE

BACKGROUND OF THE INVENTION

The invention concerns a de-burring tool in accordance with the preamble of Patent claim 1.

DISCUSSION OF THE TECHNOLOGY AND PRIOR ART

An above-mentioned de-burring tool is, for example, already known in DE-AS No. 25 59 145 from the same applicant, in which the hole edge is tracked by spring pressure so that the cutters mounted in the tool holder can de-burr eccentric or intermittent holes. With this known tool it is, however, not possible to de-burr holes in curved or oblique surfaces of work pieces because the cutters always lay in one plane and the de-burring tool itself is not axially displaceable.

With the subject of DE-AS No. 25 48 214 from the same applicant, a further de-burring tool is known, in which the cutters are guided in axial displacement in the tool holder, and the axial displacement of the cutters is achieved through the seating of corresponding tracking faces on the curved or oblique surface of the work piece. It is, however, not possible to de-burr the edges of holes in curved or oblique surfaces of work pieces as in these cases a relatively unfavourable relationship exists between the diameter of the edge of the hole and the diameter of the curved work piece.

In the case of work pieces of a relatively small diameter, or work pieces of a relatively large diameter, the de-burring action of the above-mentioned de-burring tool is insufficient.

Additionally the axial displacement of the individual cutters are interdependent so that it is, for example, not possible to de-burr randomly-profiled and curved work pieces, or those whose hole edges do not lie in a spherical plane but rather are themselves curved or deformed.

SUMMARY OF THE INVENTION

The principle objection of the present invention is to provide a de-burring tool of the type mentioned in the introduction so that randomly-profiled, curved or oblique work piece surfaces can be de-burred with greater accuracy.

To solve the problem, the invention is characterized in that the tool holder is mounted in an axially displaceable fashion in a fixed base body and the axial displacement of the tool holder is achieved by a cam which follows the curvature of the edge of the hole.

A feature of the present invention is that the individual cutters are no longer guided in axial displacement but rather that the cutters are guided in an axially fixed position in a tool holder which is itself axially and displaceably mounted in a co-relating cylindrical body.

The axial displacement of the tool holder in the base body is controlled by a cam which follows the contours of the randomly-shaped hole edges. As used herein, a deformation of the hole edge refers to a deformation in the direction of the tool holder feed.

If one uses an axially fixed tool holder in de-burring the edge of a hole which is formed in a curved work piece surface, an irregularly de-burred surface will result. It is therefore necessary in the de-burring of the edges of such holes that the cutters carry out two upwards movements and two downwards movements during one revolution on the edge of the hole. The cam in the tool-holder is therefore so formed that the tool holder performs exactly two axially-outwards and two axially-inwards movements in relation to the base body, so that the cutters are always guided in force contact with the edge of the hole and thus carry out a circular de-burring of the edge of the hole located in the curved surface of a work piece.

Another important usage of the present invention is the de-burring of oblique surfaces of work pieces e.g. when the axis of the edge of the hole lies at an angle to the feed direction of the tool holder.

In this de-burring case the de-burring tool must carry out merely one upwards and one downwards movement. The cam is correspondingly formed and in the case of this de-burring tool only one single cutter may be arranged in the tool holder which, during the course of one revolution around the edge of the hole, carries out one upwards and one downwards movement.

With the present invention it is likewise possible to de-burr the edges of holes in curvedand obliqud surfaces of work pieces and it is even possible to de-burr the edges of holes in curved surfaces of work pieces in which the hole axis lies eccentric to the transverse axis of the work piece.

Because the shape of the cam can be made to exactly correspond to the run of the edge of the hole, it is, accordingly, possible to de-burr multi-curved and corrugated edges of holes in round or partially round (oval, elliptical and the like) surfaces of work pieces.

A particular advantage of the present invention lies in the fact that the tool holder together with its fitted cutters is retained in an easy-release mounting in the base body, and therefore, optional tool holders can be used; for example, such as those described in the already quoted DE-AS No. 25 59 145 and DE-AS No. 25 48 214. In this way it is not only possible to de-burr the edges of holes in randomly curved or oblique surfaces of work pieces but it is additionally possible to de-burr randomly eccentric edges of holes in the surfaces of such work pieces because, in accordance with the technical theory of both the quoted DE-AS, the edge of the hole is tracked by corresponding tracking faces of the cutters thus controlling the radial displacement of the cutters correspondingly. A particularly simple form of construction of a de-burring tool in accordance with the invention arises out of the subject of claim 2 in that the cam is arranged in the area of a radial cam slot, that is cut into a cam body which is connected to the tool holder, in which, rolling on the cam are one or more trunnions which are connected to the base body and engage radially in the cam slot. A form-locking control of the axial displacement of the tool in the base body will be also proposed in which one or more trunnions, which are connected to the base body and engage radially in the cam slot of the tool holder, roll during the rotation of the trunnions in a form-locking action on one or both of the cams of the cam slot.

For the de-burring of curved symmetric hole edges two upwards and two downwards movements of the tool holder are carried out in the base body in accordance with the above description. Accordingly, it is possible to use two opposing trunnions which support each other on the co-related faces of the cam in the cam body.

For the de-burring of the edges of holes which lie obliquely in relation to the feed direction, merely one trunnion may be arranged in the base body which rolls on the cam in the area of the cam slot. Likewise, only one single cutter may be used.

Further features of the invention are the subject of the remaining sub-claims.

In the following, the invention will be further explained using drawings illustrating merely one embodiment example. Herewith, further essential features and advantages of the invention arise out of the drawings and their descriptions.

DETAILED DESCRIPTION OF THE PREFERRED EMBODIMENT

Figure 1:
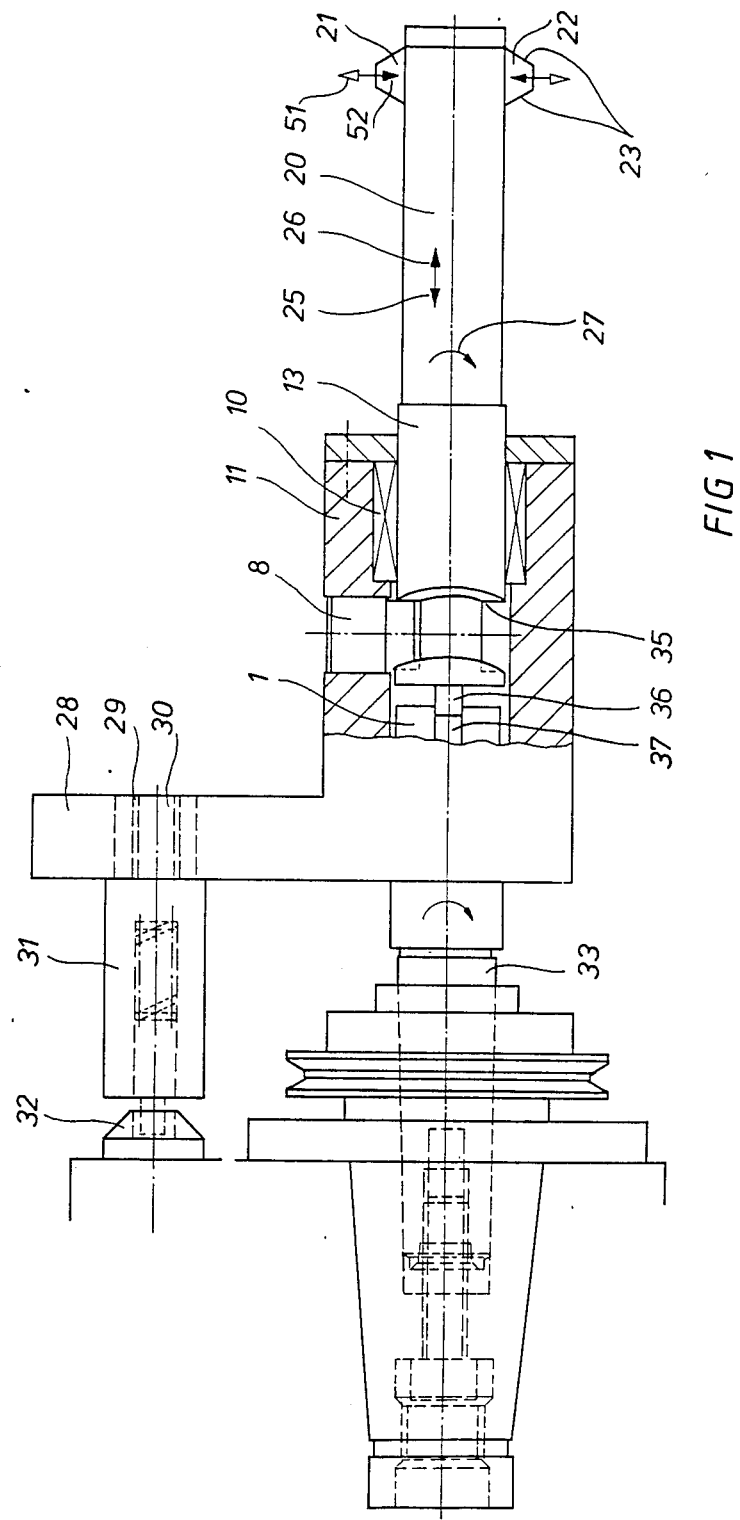
FIG. 1 is a partial section through a de-burring tool in accordance with the present invention.

In FIG. 1, the tool holder (20) is mounted so as to be displaceable in the axial directions (25)(26) in the base body (11).

The base body (11) is automatically replaceable by means of an NC-controlled tool change changer. The fixed arm (28) has a receiving hole in which the index pin of a position fixture (31) engages, and whose opposing pin engages in a fixed receiver bushing (32) on the drive housing of the machine tool.

The rotational drive in the direction of arrow (27) is achieved through the drive shaft (33) which drives the tool holder (20) rotationally. Holder (20) is rotationally mounted by means of corresponding bearings (10) in the base body (11).

Figure 4:
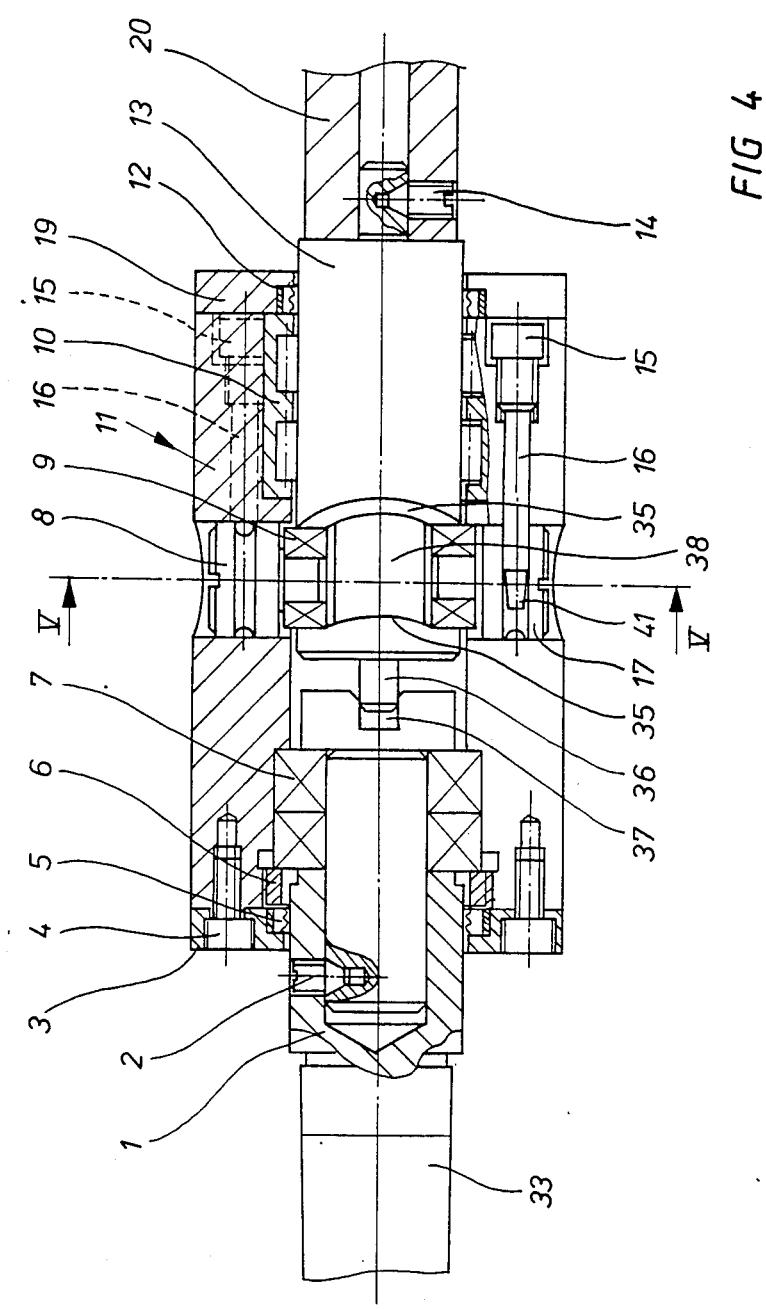
FIG. 4 is a partial section through the de-burring tool according to FIG. 1.

The axial displacement in the direction of arrows (25)(26) of the tool holder (20) is achieved in that on the front face of a cam body (13) a cam (35) is formed, on which the bearing mounted follower (9) rolls (see FIG. 4). Each cam follower (9) is secured to a stationary trunnion (8) in the base body (11).

Drive of the cam body (13) in the direction of arrow (27) is achieved through a coupling which consists of a pin (36) of, for example, square section which engages in a co-related socket or slot (37) on the opposing guide pin (1).

On the front, free end of the tool holder (20) two opposing cutters (21) are arranged which have cutting edges (23) on both advancing and retreating sides.

The cutters are mounted so as to be displaceable in the direction of arrows (51)(52), in the tool holder (20) so that with such a de-burring tool it is possible to deburr even eccentric edges of holes.

A simplified embodiment could, however, be provided wherein a single cutter (21) is arranged in the tool holder (20), and a further (not illustrated) embodiment could provide that the cutter is replaced by a face-mounted conical cutter (counter sinker).

Figure 2:
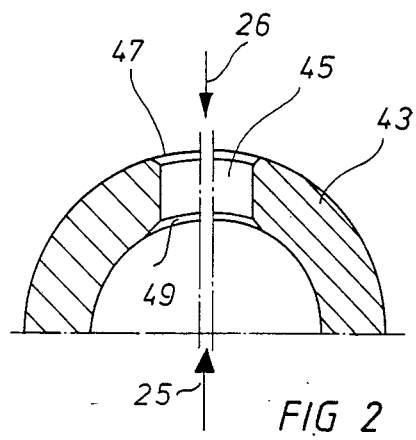
FIG. 2 is a section through a work piece with a curved symmetric hole edge.

With the de-burring tool shown in FIG. 1 it is accordingly possible to de-burr the work piece (43) shown in FIG. 2 on both the upper edge (47) of the hole (45), by engagement in the direction of arrow (26) and the inner edge (49) of the hole (45), by engagement in the direction of arrow (25).

It is necessary here that after de-burring of the upper hole edge (47) by the advancement of the de-burring tool in the direction of arrow (26) the cutters (21) must be adjusted radially inwards in the direction of arrow (52) shown in FIG. 1 so that the tool passes may be passed through the hole (45) without cutting and, after exit from the hole (45) on the return stroke (arrow direction 25) be caused to de-burr the inner edge (49) of the hole after the cutters (21)(22) are extended in the direction of arrow (51).

Figure 3:
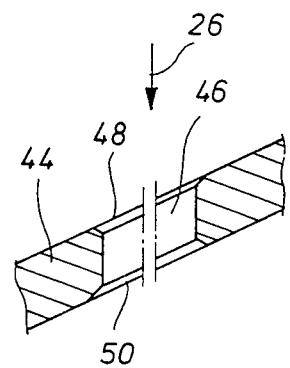
FIG. 3 is a section through a work piece with an oblique hole edge.
Figure 5:
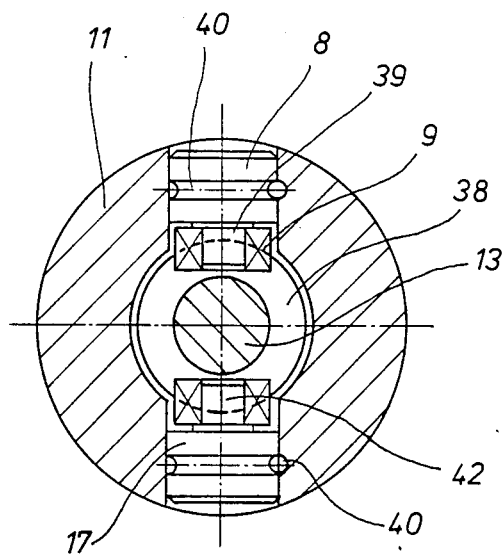
FIG. 5 is a section through V—V in FIG. 4.

The same type of de-burring action is also possible in the case of the oblique edges (48)(50) shown in FIG. 3 which are respectively arranged on the entrance and exit sides of the hole (46) in the area of the work piece (44).

In accordance with the illustration in FIG. 4, the drive shaft (33) is secured against rotation by a conical grub screw (2) in which the taper of the cone acts in such a way that during screwing-in of this grub screw (2) the two adjacent ball bearings (7) are pressed together axially and pre-loaded.

The pressing together of both ball bearings (7) is achieved in that one ball bearing (7) face is supported on a shoulder on the base body (11) and the other ball bearing face abuts a shoulder on the guide pin (1).

On the face of the guide pin (1) a bearing cap (3) is arranged which is secured to the base body (11) by screws (4), where (5) is a sealing ring and (6) is a threaded ring which returns the ball bearing (7).

In this way the guide pin (1) is retained rotatably in the base body (11).

The rotary coupling which achieves the axial displacement by rotation of the cam body (13) as previously described, is accomplished by means of the engagement between the facing socket or slot (37) and pin (36) which is secured against rotation in the cam body (13).

The mounting of the cam body (13) in the base body (11) is achieved in the following manner:

On the opposing face of the base body (11) a bearing cap (19) is connected to the base body (11) with screws which are not illustrated in the drawing. On the inner periphery of cap (19) a sealing ring (12) is fitted and circumscribes the rotatable cam body (13). On the external periphery of the rotatable and axially displaceable cam body (13) a needle roller bearing (10) is fitted which abuts, on one side, the face of the cap (19) and on the other side, a fixed shoulder on the base body (11).

On the face of the cam body (13) the previously mentioned cam (35) is located and forms part of a cam slot (38) in which on the opposing face of the cam slot, another cam (35) is formed. In this way the complete cam body (13) is guided by the trunnions (8) in a form-locking fashion as they traverse the cam slot (38) and one ball bearing follower (9) follows one cam (35) and the other ball bearing follower (9) follows the opposite cam (35).

Both follower (9) are fitted on a pin (39) of the trunnion (8). During the de-burring of asymmetric hole edges only one single trunnion (8) is used, whereas in the embodiment shown, one de-burring tool for the de-burring of symmetrical hole edges is shown where two opposing trunnions (8)(17) with corresponding follower (9) are used.

With the de-burring tool shown in FIG. 4 it would also be possible to de-burr a hole edge of the type shown in FIG. 2 in an exactly circular hole periphery because in this case two high points and two low points of the cam are necessary, and both the opposingly located trunnions exactly track the high and low points.

In the case of an asymmetric hole in accordance with FIG. 3 only one single high point and one single low point would be used so that only one single trunnion (8) is available and the opposing trunnion (8) in FIG. 4 is then removed and another shape of cam is required.

The securing and locating of the trunnion (8) in the base body (11) is described as follows:

In the embodiment shown, the upper trunnion is mounted centrally whereas the lower trunnion (17) is eccentrically adjustable to achieve a backlash-free fitting to the cam surfaces (35).

The upper trunnion (8) and the lower trunnion (17) both have an annular recess (40) provided in their outer surfaces in which the conical end (41) of a postioning pin (16) engages, which pin is axially displaceable in that its face end abuts the threaded portion of a thrust screw (15) which is screwed into a corresponding threaded hole in the base body (11).

By adjustment of the thrust screw (15) the conical end (41) of the positioning pin (16) presses to a greater or lesser degree in the radial recess (40) of the trunnions (8)(17).

In this way the trunnions (8)(17) are secured against falling out and against rotation in the corresponding hole in the base body (11).

Removal of both trunnions (8)(17) brings the followers (9) out of engagement with the cam slot (38) and allows the complete cam body (13) to be simply withdrawn from the front of the base body (11) and to be replaced by a corresponding different de-burring tool.

This makes it particularly simple to re-work a corresponding cam slot (38) in the respective cam bodies (13).

The lower trunnion (17) is adjustable eccentrically in the previously described fashion to achieve a backlash-free fitting between its ball bearing followers (9) and the corresponding cam surfaces (35).

The centralizing adjustment is achieved in that the pin (42) which accepts the ball bearing follower (9) is arranged eccentrically with reference to the central longitudinal axis through the trunnion so that by rotation of the trunnion (17) the follower adjusts to a greater or lesser degree in the axial direction of the body (13) thus abutting to a greater or lesser degree, the corresponding cam surface (35).

Subsequent to correct backlash-free adjustment of the lower trunnion (17) it is locked in position, by engagement of the positioning pin (16) in the corresponding recess (40) by the screwing-in of the thrust screw (15).

By means of the bearing cap (19) screwed on the face, both thrust screws (15) are secured against inadvertant movement and falling out.

By means of the grub screw (14) the optional tool holder (20) can be secured in the cam body (13) and is thus easily retained in an interchangeable fashion.

The grub-screw (14) has the further task of determining the exact rotational position of the tool holder in relation to the cam body (13).

By means of adjustment of the grub screw (14) and rotation of the tool holder it must be ensured that the cutters (21)(22) abut the highest point of the hole edges (47–50) when the cam body (13) has assumed its maximum possible axially inwards-directed position of displacement.

In the present embodiment a cam slot (38) with two opposingly-facing cams was described.

In a modification of the present invention it is also possible to use a cam slot (38) open on one side which therefore has only one single cam. It is necessary here that the cam body (13) is axially spring-loaded with its cam pressed against the corresponding ball bearing follower (9) on the trunnion (8); the opposing cam (35) is then not required.

A feature of this simplified embodiment is, however, that only one de-burring action in the advancing mode is possible. The device can not be used in the retreating mode because in the retreating mode the spring pressure would possibly be insufficient to press the cam (35) on to the corresponding follower (9) of the trunnion (8) with enough force.

This simplified embodiment is therefore basically only suitable for de-burring tools to be used for forwards moving de-burring.

In a further simplified embodiment the eccentric adjustment of the lower trunnion (17) can be dispensed with, it being then perfectly possible, technically, to exactly prepare the cam slot (38) so that the followers (9) of both the opposing trunnions (8)(17) form-lock basically without backlash onto the corresponding cams (35) of the cam slot (38). This however requires extreme precision of manufacture if all backlash is to be avoided.

I claim:

1. A de-burring tool for the de-burring of hole edges (47–50), particularly those formed in curved or oblique work piece surfaces, and including a rotationally-driven tool holder (20) in which one or more cutters (21) (22) are arranged, and in which motion is controlled in an axial direction, characterized in that the tool holder (20) is axially and displaceably mounted in a fixed base body (11), in that the axial displacement of the tool holder (20) is achieved by a cam means (35) which follows the curvature of the edges (47–50) to be de-burred, said cam means being formed by an annular cam slot (38) which is cut into a cam body (13) which is connected to the tool holder (20), in that said cam means are engaged by follower means, the follower means including at least two trunnions (8) (17) which are adjustably connected to the base body (11) and mount rotatable bearing means on pins extended radially into the cam slot (38), achieving a form-locking fit of the trunnion (17) to the cam means (35), and in that on the centrally-mounted head of one of the trunnions (17) the pin (42) is arranged eccentrically to the trunnion's middle longitudinal axis, and the bearing means (9) are arranged on the pin (42), whereby rotary adjustment of said one of the trunnions (17) is effective to eliminate backlash between the cam means and the bearing means.

* * * * *